Jan. 6, 1942.   F. G. H. HEDLUND   2,269,104
INTERNAL COMBUSTION ENGINE
Filed May 11, 1939
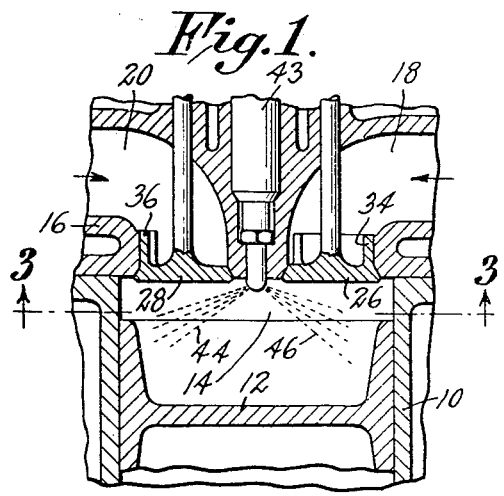
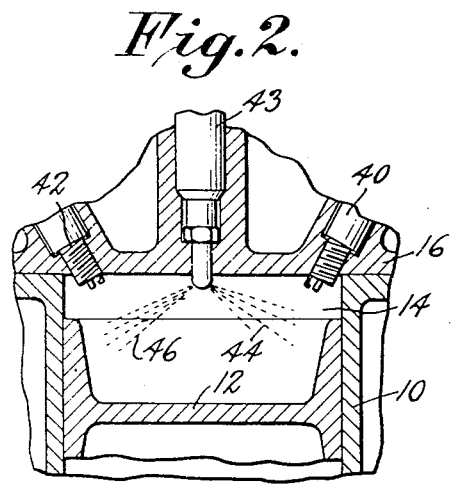
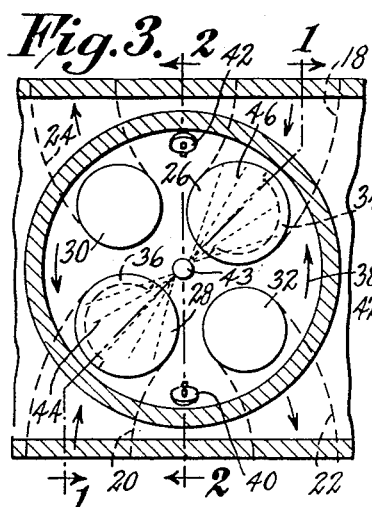
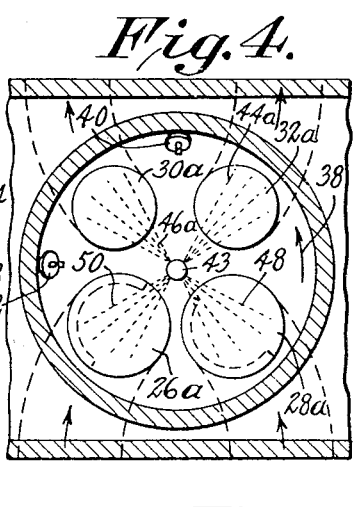
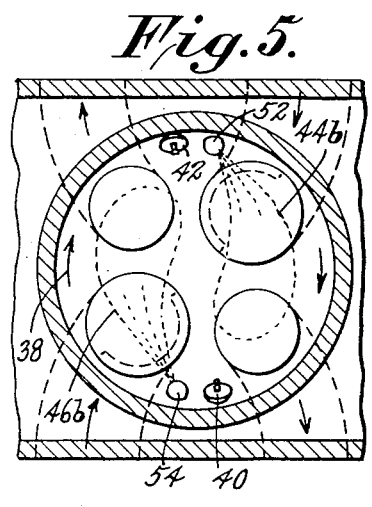
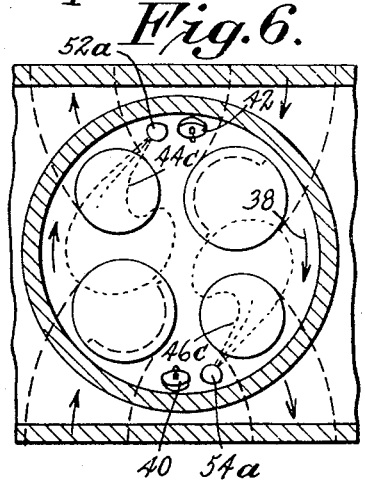
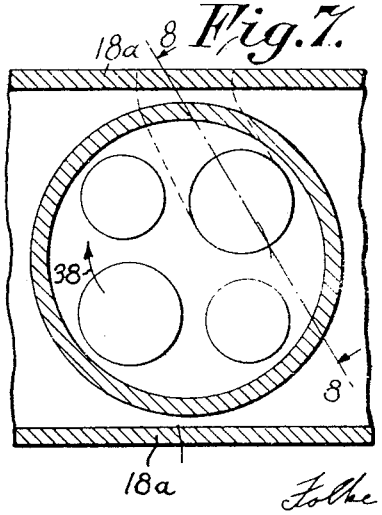
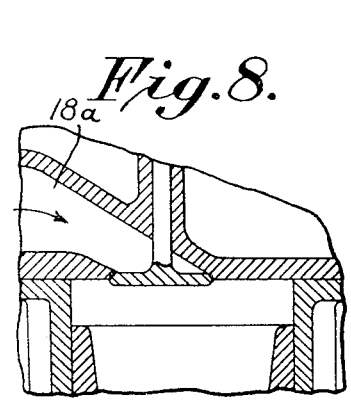
INVENTOR.
Folke Gustaf Hjalmar Hedlund
BY
his ATTORNEY.

Patented Jan. 6, 1942

2,269,104

UNITED STATES PATENT OFFICE 2,269,104

INTERNAL COMBUSTION ENGINE

Folke Gustaf Hjalmar Hedlund, Stockholm, Sweden, assignor, by mesne assignments, to Jarvis C. Marble, Chester A. Adee, and George Carlson, trustees Application May 11, 1939, Serial No. 273,134
In Sweden May 13, 1938

5 Claims. (Cl. 123—32)

The present invention relates to internal combustion engines of the kind in which fuel is injected and ignited during normal operation by means other than the heat of compression. More specifically, the invention relates to high power engines of the above kind, such for example as are used for aircraft propulsion.

If a maximum power is to be derived from a given size engine, it is in nearly all cases essential to use a plurality of inlet and exhaust valves and also it is usually desirable to utilize a plurality of spark plus. Frequently engines, especially aircraft engines, are provided with two inlet valves and two exhaust valves per cylinder and with two spark plugs, making for better engine efficiency and reliability.

In order to secure the advantages obtainable by the use of dual valves and further to be obtained by the use of dual ignition equipment, when these elements are applied to injection engines of the kind in which fuel is injected directly into the combustion chamber, certain difficulties are encountered in obtaining the desired characteristics of ignition and combustion and it is the general object of the present invention to provide a novel arrangement of parts which will insure efficient operation of a direct injection type of engine having dual valve equipment. To this end the injection of fuel is effected by means of a plurality of jets or sprays, the location of which bears a predetermined relationship, hereinafter to be more fully pointed out, to the valve structure and to the ignition means so that most efficient combustion can be obtained and so that when ignition is effected at a plurality of places in the combustion chamber, it will be simultaneously effected at the several places.

For a better understanding of the nature of the invention and the manner in which its objects are attained, reference may best be had to the ensuing portion of this specification in which suitable forms of apparatus for carrying it into effect are described by way of example.

In the accompanying drawing forming a part hereof:

Fig. 1 is a more or less diagrammatic axial section. taken on line I—I of Fig. 3, of the combustion chamber of an engine embodying the invention;

Fig. 2 is an axial section taken on the line 2—2 of Fig. 3;

Fig. 3 is a section taken on the line 3—3 of Fig. 1;

Fig. 4 is a section similar to Fig. 3 showing another valve arrangement;

Fig. 5 is a section similar to Fig. 3 showing the same valve arrangement as that of Fig. 3 but a different arrangement of injection means;

Fig. 6 is a view similar to Fig. 5 showing still another arrangement of injection means;

Fig. 7 is a view similar to Fig. 3, of an engine having a different arrangement for admission of air to the combustion chamber; and Fig. 8 is a section taken on the line 8—8 of Fig. 7.

Referring now more particularly to Figs. 1 to 3 of the drawing, the engine cylinder is indicated at 10 and the piston at 12. Advantageously, the piston is circumferentially flanged to provide a combustion chamber 14, the major portion of which is located within the piston when the latter is at the top of its stroke.

The cylinder head 16 which is shown separable from the cylinder, but which it will be understood may be integral with the cylinder barrel, is provided with dual inlet passages 18 and 20 for admission of air and with dual exhaust passages 22 and 24. The inlet passages are controlled by inlet valves 26 and 28 respectively, and the exhaust passages are controlled by exhaust valves 30 and 32 respectively.

Air is admitted to the cylinder to have rotary movement in the combustion chamber generally about the axis of the cylinder, and in the embodiment illustrated the desired rotary movement of the air is secured in known manner by the use of semicircular skirts 34 and 36 on the inlet valves 26 and 28 respectively, which skirts do not clear the valve seats when the valves are open and which operate to deflect the incoming air in tangential direction to produce rotation of the air of the cylinder in the direction indicated by arrow 38 in Fig. 3. The skirted inlet valves for producing air rotation constitute only one of a number of different known means for securing this type of air admission and in so far as the present invention is concerned, other means for securing air rotation may be employed, as will hereinafter more fully be pointed out.

The cylinder head 16 carries dual spark plugs 40 and 42 located at diametrically opposed positions adjacent the periphery of the combustion chamber, and injection is effected by means of a centrally located injector 43 carried in the cylinder head and provided with suitable spray nozzles for projecting diametrically opposed fuel jets 44 and 46 into the combustion chamber.

The operation of the engine just described is as follows:

On the intake stroke of the piston 12, air is inducted into the cylinder past the inlet valves 26 and 28 which impart rotary motion to the air in the direction of arrow 38. The rotating air charge is compressed during the compression stroke and preferably during the latter part of the injection stroke fuel is injected into the combustion chamber through the medium of the jets 44 and 46.

As will be observed from Fig. 3, the fuel jets in the present arrangement are directed to pass in front of the faces of the diametrically opposed inlet valves, but it will be evident that as the fuel is injected it will be turned in counter-clockwise direction as viewed in Fig. 3 by the movement of the rotating air charge with which the fuel mingles. It will further be observed from Fig. 3 that the movement of the rotating air charge will carry the injected fuel across the faces of the exhaust valves, since it will be understood that an appreciable time is required to effect injection of the fuel charge and that a certain time interval elapses between the commencement of injection and ignition. This time interval is preferably such as to permit a full load charge of fuel to be injected before ignition is effected. Consequently, in the arrangement shown in Fig. 3, fuel from the jet 44 will be carried by the rotating air charge past the plug 40 to the vicinity of the plug 42, and fuel from the jet 46 will be carried past plug 42 to the vicinity of the plug 40, by the time ignition occurs.

It will be seen that during this movement the fuel from each of the two jets is carried past the surface of a hot exhaust valve before reaching the place of ignition and it will further be observed that the arrangement and location of the jets and plugs with reference to the valves provides a like grouping for each jet. As a result of this like grouping of the several elements involved, the fuel from each jet reaches its place of ignition at substantially the same time and in substantially the same condition, since each jet has been subjected to substantially the same conditions with respect to temperatures and path of travel. Consequently, simultaneous ignition and like character of combustion is provided at the different places of ignition and rapid, uniform, and effective combustion of the entire charge results. Preferably the arrangement is such that the injected fuel from any jet which is to be ignited through the medium of a plug or other ignition means is injected in such manner that it travels past the face of an exhaust valve before reaching the place of ignition since the heat radiated from the hot valve surface is useful in providing at least partial vaporization of the finely divided or atomized liquid fuel delivered from the injector.

It is highly important in order to secure the advantages of the present invention that each spray which is to be ignited is located in the same relation with respect to the exhaust and inlet valves and other parts which affect the radiant heat conditions in the combustion chamber as every other spray which is to be ignited by ignition means which operates at the time when ignition for the cylinder is initiated.

This condition may be effected with numerous different specific arrangements and locations of ignition means, valves, and injector orifices and it will of course be understood that the relation of the timing of injection with respect to ignition may vary from a substantially simultaneous condition to one of appreciable delay, depending upon the direction of injection of the sprays to be ignited and the distance the fuel therefrom has to travel before reaching the ignition means. It will further be understood of course that the arrangement need not be limited to the use of only two sprays or two ignition means.

In Fig. 4 another arrangement illustrative of the principles of the invention is shown. In this arrangement the inlet valves 26a and 28a are arranged adjacent to each other at one side of the cylinder while the exhaust valves 30a and 32a are located adjacent to each other at the opposite side of the cylinder. The central injector 43 has orifices providing four fuel jets, two of which 44a and 46a may be said to constitute ignition jets, and two of which, 48 and 50 may be said to constitute auxiliary jets. Further, the plugs 40 and 42 are located at 90° from each other rather than diametrically opposed as in the form shown in Fig. 3.

As will be observed from Fig. 4, the ignition jets 44a and 46a are directed so as to pass in front of the faces of the exhaust valves before reaching the vicinity of their respective ignition places. and as will further be observed, the arrangement is such that the conditions to which the ignition jets are subjected are the same between the time of commencement of injection and the time of ignition, both as to factors of temperature and path of travel of the fuel from the injector to the places of ignition.

In Fig. 5, another arrangement is illustrated in which the valves and spark plugs are located in relation to each other in the same manner as previously described in connection with Fig. 3. In the present instance, however, two injectors 52 and 54 are employed, which are located in diametrically opposed positions adjacent the periphery of the combustion chamber, and which project ignition fuel jets approximately along chords in the same direction as that of the rotation of the air charge. As will be observed from the figure, fuel from the jets 44b and 46b, projected from the injectors 52 and 54 respectively, passes in each case an inlet valve and an exhaust valve in the order named before reaching the places of ignition provided respectively by the plugs 40 and 42. Thus, the fuel from each jet is subjected to substantially identical conditions during the period between commencement of injection and time of ignition.

The arrangement shown in Fig. 6 is the same as that in Fig. 5 with respect to location and arrangement of valves and plugs, but in this instance the injectors 52a and 54a are provided with orifices which project the jets of fuel 44c and 46c along chords in directions opposed to rather than in the same direction as the direction of rotation of the air charge. In this case the injected fuel in each instance first passes an exhaust valve before being carried in reverse direction by the rotating air charge to the place of ignition. As in the previously described embodiments, the arrangement of the essential parts into like groupings is employed and as will be observed from the figure, each jet is subjected to like conditions during the time the fuel is in the cylinder prior to ignition.

As previously noted, the means of air admission to the cylinder for securing air rotation may be of any suitable form and by way of further example there is shown in Figs. 7 and 8 a cylinder arrangement in which the inlet and exhaust valves are respectively located in diametrically opposed positions as in the arrangement shown in Fig. 3 and in which, as indicated in Fig. 8, tangentially arranged air admission passages 18a are provided for admitting air in tangential direction to secure rotation thereof in the direction indicated by arrow 38 of Fig. 7.

In the present embodiment the centrally located injector 43 is provided with orifices which project ignition jets 44d and 46d across the faces of the exhaust valves 30 and 32, respectively. Jets in addition to the ignition jets may, of course, be employed if desired. The plugs 40 and 42 are diametrically opposed and by reference to the figures it will be evident that the tangentially admitted air which rotates in the direction of the arrow 38 will carry the fuel from jets 44d and 43d to the vicinity of the plugs 42 and 40 respectively.

It will be observed that this disposition provides the symmetrical arrangement of the component parts which constitutes the preferred arrangement and further provides the preferred form of arrangement in which the injected fuel from each injection jet is brought into proximity with a hot exhaust valve before reaching the place of ignition.

It will be understood that the various arrangements previously described in connection with the skirted valve inlet structures may equally well be applied to a structure employing tangential air admission for securing the rotating air effect in the cylinder chamber, and since the manner of application of the principles of the invention in various embodiments to structures having tangential or other means for securing air rotation will be evident to those skilled in the art, it is not believed necessary to describe further specific embodiments of valve, spark plug, and injector arrangements as applied to such structures.

It will further be understood that in accordance with the principles of the invention the multiple plugs are timed to fire simultaneously and that the direction and timing of the different ignition jets will be such as to provide ignitible charge portions simultaneously in the vicinities of the different plug locations.

From the foregoing it will be apparent that many different specific forms and arrangements of structure may be employed within the scope of the invention which is to be understood as embracing all structures falling within the scope of the appended claims.

What is claimed is:

1. In an internal combustion engine of the injection type, a cylinder and piston providing a combustion chamber, means for admitting air to said chamber, a plurality of exhaust valves, injection means providing a plurality of jet orifices for projecting a plurality of ignition jets of finely divided fuel into the chamber, and a plurality of ignition means, said exhaust valves, said orifices and said ignition means being arranged to provide a plurality of like groups of elements for injection of fuel from the ignition jet orifices into the chamber so that the jet from each ignition jet orifice is subjected to substantially the same conditions during the period preceding ignition and is further projected into the chamber so as to pass the face of an exhaust valve prior to ignition.

2. In an internal combustion engine of the injection type, a cylinder and piston providing a combustion chamber, means for admitting air to said chamber with rotary movement about the axis of the cylinder, a plurality of exhaust valves, injection means providing a plurality of jet orifices for projecting a plurality of ignition jets of finely divided fuel into the chamber, and a plurality of ignition means, said exhaust valves, said orifices and said ignition means being arranged to provide a plurality of like groups of elements for injection of fuel from the ignition jet orifices into the chamber so that the jet from each ignition jet orifice is subjected to substantially the same conditions during the period preceding ignition and is further projected into the chamber so as to be carried past an exhaust valve by the rotating air before reaching its place of ignition.

3. In an internal combustion engine of the injection type, a cylinder and piston providing a combustion chamber, means including dual inlet valves in the cylinder head for admitting air to said chamber with rotary movement generally about the axis of the cylinder, dual exhaust valves in the cylinder head, said valves being symmetrically arranged about the axis of the cylinder, dual spark plugs and injection means providing a plurality of jet orifices for projecting dual ignition jets of finely divided fuel into the chamber, said valves, said orifices and said plugs being arranged to provide a plurality of like groups of elements for injection of fuel from the ignition jet orifices into the chamber so that the jet from each ignition jet orifice is subjected to substantially the same conditions during the period preceding ignition and is further projected into the chamber in a direction causing a substantial portion of the fuel of the jet to pass in proximity to an exhaust valve and thereby be subjected to the vaporizing influence of heat radiated from the face of said exhaust valve before being carried to its place of ignition by the rotating air.

4. In an internal combustion engine of the injection type, a cylinder and piston providing a combustion chamber, means including dual inlet valves in the cylinder head for admitting air to said chamber with rotary movement generally about the axis of the cylinder, dual exhaust valves in the cylinder head, said inlet valves and said exhaust valves being diametrically opposed respectively, dual spark plugs located in diametrically opposed relation, and injection means providing jet orifices for projecting dual ignition jets of finely divided fuel into the chamber in directions such that a substantial portion of the fuel from each ignition jet is caused to pass in proximity to a different one of said exhaust valves and thereby be subjected to the vaporizing influence of heat radiated from the face of the cooperating exhaust valve before being carried to the vicinity of a spark plug.

5. In a internal combustion engine of the injection type, a cylinder and piston providing a combustion chamber, means including dual inlet valves in the cylinder head for admitting air to said chamber with rotary movement generally about the axis of the cylinder, dual exhaust valves in the cylinder head, said inlet valves and said exhaust valves being diametrically opposed respectively, dual spark plugs located in diametrically opposed relation, and a centrally located injector having jet orifices for projecting dual ignition jets of finely divided fuel in diametrically opposed directions so that a substantial portion of the fuel from each of said jets will be caused to pass in proximity to a different one of said exhaust valves and thereby be subjected to the vaporizing influence of heat radiated from the face of the cooperating exhaust valve before being carried to the vicinity of the appropriate one of said plugs by the rotating air.

FOLKE GUSTAF HJALMAR HEDLUND.

CERTIFICATE OF CORRECTION.

Patent No. 2,269,104. January 6, 1942.

FOLKE GUSTAF HJALMAR HEDLUND.

It is hereby certified that error appears in the above numbered patent requiring correction as follows: In the drawing, Figures 7 and 8 should appear as shown below instead of as shown in the patent -

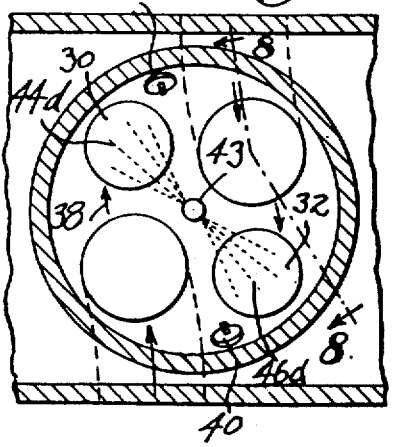
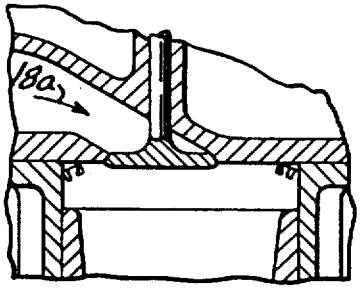

and that the said Letters Patent should be read with this correction therein that the same may conform to the record of the case in the Patent Office.

Signed and sealed this 5th day of May, A. D. 1942.

(Seal)

Henry Van Arsdale,
Acting Commissioner of Patents.